April 12, 1955
N. G. H. LINDHOLM ET AL
2,706,288
APPARATUS FOR INDICATING THE AVERAGE
SPEED OF TRAVEL OF A VEHICLE
Filed Dec. 5, 1951
2 Sheets-Sheet 1
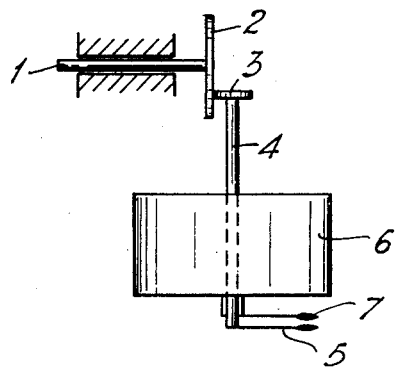
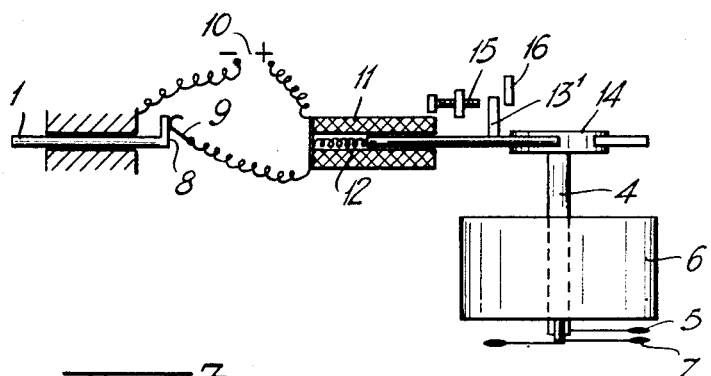
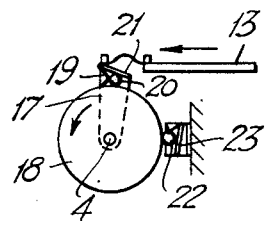
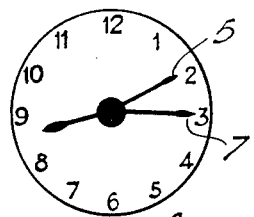
Inventors
Nils Gosta Hjalmar Lindholm
Stig Olof Juselius
by Sommers & Young
Attorneys April 12, 1955 N. G. H. LINDHOLM ET AL 2,706,288
APPARATUS FOR INDICATING THE AVERAGE
SPEED OF TRAVEL OF A VEHICLE
Filed Dec. 5, 1951 2 Sheets-Sheet 2
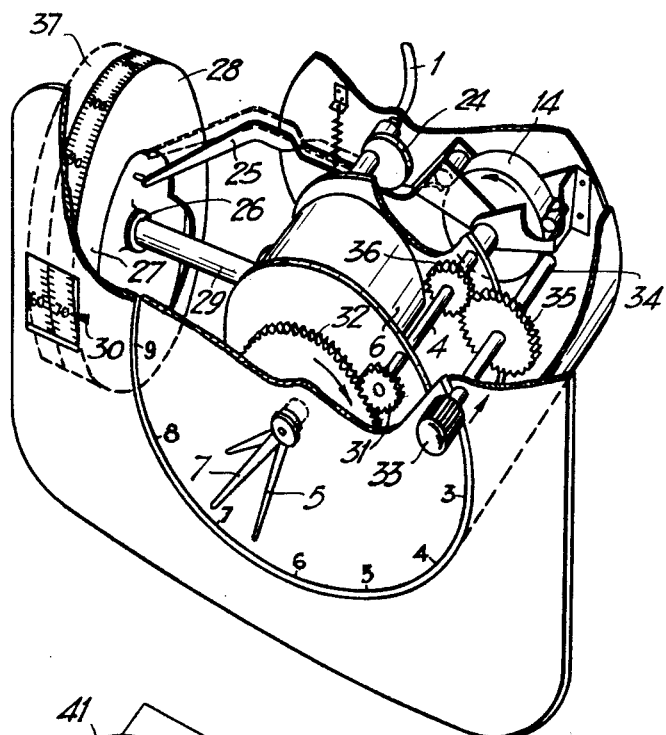
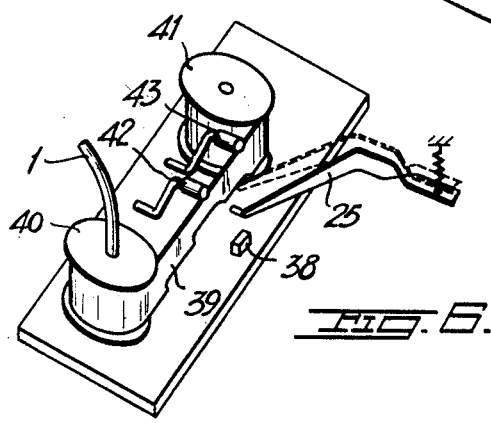
Inventors
Nils Gosta Hjalmar Lindholm
Stig Olof Juselius
by Sommers Young
Attorneys

United States Patent Office 2,706,288
Patented Apr. 12, 1955

2,706,288

APPARATUS FOR INDICATING THE AVERAGE SPEED OF TRAVEL OF A VEHICLE

Nils Gösta Hjalmar Lindholm and Stig Olof Juselius, Finspong, Sweden

Application December 5, 1951, Serial No. 259,984

Claims priority, application Sweden December 19, 1950

7 Claims. (Cl. 340—268)

The present invention relates to an apparatus for indicating the average speed of a motor car or other vehicle.

An object of the invention is to provide an apparatus of said kind which continuously indicates any deviation of the speed of travel of the vehicle from a desired average speed and also indicates how much longer or shorter time the vehicle has required for covering a given distance as a result of such deviations.

The apparatus according to the invention comprises a time clock having in addition to its usual hands a special pointer controlled independently of the clock-work by power derived from a member of the vehicle moving in unison with the speed of travel of the vehicle through the intermedium of a gear of constant or variable ratio of gear in such a way that said pointer is caused to rotate in clockwise direction at the same angular velocity as one hand of the clock, when the average speed of travel of the vehicle corresponds to the average speed desired, and in agreement with which the gear for controlling said pointer is adjusted.

In the accompanying drawings the invention is illustrated by way of example. It is to be noted that similar parts of the various figures of the drawing are designated by the same reference numerals.

Fig. 1 is a substantially diagrammatic plan view of a unit exemplifying the principle of the invention. Fig. 2 is a substantially diagrammatic plan view of a modified embodiment of the invention. Fig. 3 is an elevation of a detail of the embodiment shown in Fig. 2. Fig. 4 is a front view of the dial of the clock with hands and special pointer shown. Fig. 5 is a perspective view, with parts of the casing removed, of a constructional form of the apparatus, and Fig. 6 is a perspective view of a modified detail of the apparatus shown in Fig. 5.

In Fig. 1 the reference numeral 1 indicates a shaft adapted to be connected to a member of the vehicle which rotates in unison with the speed of travel of the vehicle, such as a wire for controlling the speed indicator of the vehicle. Through a change speed friction gear 2, 3 the shaft 1 is operatively connected to a shaft 4 extending through the clockwork of a clock 6 and supporting in front of the dial of said clock a pointer 5 which is mounted to rotate concentrically with relation to the usual hands of the clock, one of which, hereinafter referred to as the minute hand, is indicated at 7.

The change speed gear 2, 3 should be so adjusted that, in the operation of the device, the pointer 5 of shaft 4 rotates at the same angular velocity and in the same direction as the hand 7 at a given average speed of travel of the vehicle. Upon an increase of the speed of travel of the vehicle the pointer 5 increases its velocity above that of the minute hand 7, whereas a decrease of the speed of travel of the vehicle causes the pointer 5 to rotate more slowly than the minute hand. The deviation between the positions of the pointer 5 and the hand 7 with relation to each other thus occurring indicates the time in minutes which has been gained or lost as a result of the variation of the average speed of travel of the vehicle.

It is obvious that, in this embodiment, a given setting of the gear 2, 3 always corresponds to a certain average speed of travel.

In the embodiment shown in Fig. 2, the reference numerals 1, 4, 5, 6 and 7 designate similar details as in Fig. 1. The shaft 1 is formed with a laterally projecting arm 8 which makes electric contact with the spring 9 once at each revolution of the shaft. Each time this contact is made a circuit is closed from a source of current 10 through the winding of an electromagnetic coil 11, which is energized and attracts an armature 13 against the action of the spring 12. Through a change speed gear 14, the construction of which is shown in detail in Fig. 3, the shaft 4 with its pointer 5 is rotated, so that the pointer may indicate deviations from the average speed of travel desired, as already explained in connection with the description of Fig. 1. The ratio of gear is determined by the length of stroke of the armature 13, which length of stroke in its turn may be determined by a stop screw 15 and a rigid stop 16, between which stops a lateral projection 13' of the armature 13 reciprocates.

In Fig. 3 the construction of the change speed gear 14 is shown more in detail. The armature 13 is connected to a lever 17 rotatably mounted on the shaft 4 which carries a friction wheel 18 rigidly secured to shaft 4. When the armature 13 is moved in the direction of the arrow a roller 20 loaded by a spring 19 takes the wheel 18 with it because of the jamming of the roller between the circumference of the wheel 18 and a laterally projecting member 21 of the lever 17 which extends in an oblique direction with relation to the circumference of wheel 18. When the armature is moved in the opposite direction, said jamming action ceases, allowing the wheel 18 to stop in its momentary position. In order to cause the wheel to positively stop and remain in said position a braking device is provided comprising a roller 22 engaging into between the circumference of the wheel 18 and a stationary member 23 forming such an angle with said circumference as to cause the roller 22 to be jammed between it and the circumference of wheel 18 upon a tendency of the wheel to move in a direction opposite to the curved arrow shown, while allowing free movement of the wheel in the direction of the arrow. In other words, the wheel 18 may only rotate in the counter-clockwise direction in the drawing under the action of the armature 13 and the friction ratchet gear comprising the elements 19, 20 and 21.

In the embodiments above described the change speed gear 2, 3 or 14 may be replaced by a gear having an invariable ratio of gear corresponding to a given speed of travel of the vehicle.

In the embodiment shown in Fig. 5 the primary shaft 1 carries an eccentric 24 bearing against which is a spring loaded lever 25 having at its free end a laterally projecting pin which, upon the rotation of shaft 1 and resulting oscillating movement of lever 25 is moved back and forth between a point of the periphery of a disc 26 and a point of the curved inner periphery of a disc 27. Said discs 26 and 27 form parts of a wheel or drum 28 rotatably mounted on a shaft 29 which is provided on its circumference with a velocity scale in order to allow adjustment of the mechanism for a speed desired by setting the respective scale division into register with a stationary index 30. The lever 25 tranmits by a mechanism similar to the mechanism 14 of Fig. 3, which is also indicated by the reference numeral 14 in Fig. 5, its movement to the shaft 4 which in this case represents an intermediate shaft connected by means of a gearing 31, 32 to the shaft of the special pointer 5, in order to cause said pointer to move at the same velocity and in the same direction as the minute hand 7 of the clock 6, when the speed of travel of the vehicle agrees with the speed marked on the drum 28 by the index 30. For turning the pointer 5 into a position right in front of the minute hand 7, for instance, at the beginning of a travel, there is provided a hand knob 33 mounted on a rotatable and slidable shaft 34 which is connected by means of a toothed gearing 35, 36 to shaft 4. Said toothed gears are brought into mesh with each other when the knob 33 and thus the shaft 34 is pushed inwards.

The mechanism as above described with reference to Fig. 5 may be completed with a wheel 37 rotatably mounted on the shaft 29 and positioned by the side of drum 28. Said additional wheel 37 is logarithmically graduated in time (for instance, minutes). If the scale of drum 28 is also logarithmic and is assumed to indicate, besides speed of travel, also length of way (for instance, kilometer), the length of way to be covered by the vehicle during a given travel, may be set to a position in register with the time considered as a suitable one, and then the corresponding speed may be read off on the drum 28 in register with the end point of the scale of wheel 37, whereupon the drum 28 should be rotated until the digit read off takes up a position in register with the index 30. It is thus obvious that the mechanism operates principally like a slide-rule.

In Fig. 6 is illustrated an alternative form of those elements of the apparatus with which the free end of lever 25 cooperates. The free end of lever 25 may in this embodiment oscillate between a stationary stop 38 and the lower edge of a band 39 the profile of which is shaped in conformity with a predetermined curve, said band 39 being fed at a velocity proportional to speed of travel of the vehicle between a pair of reels 40 and 41. The band is guided on its way between said reels by means of rollers 42 and 43 which bear against the upper edge of the band. By this means the length of stroke of the free end of lever 25 may be varied according to a scheme determined by the contour of the lower edge of the band cooperating with said free lever end, resulting in an adjustment of the speed desired which varies automatically with the length of way covered by the vehicle.

It is to be noted that the invention may be applied both to road vehicles and to ships and aircrafts.

We claim:

1. An apparatus for indicating the average speed of travel of a vehicle comprising in combination, a time clock including a clockwork, a dial and hands, a separate pointer mounted for rotation in front of said dial concentrically with the hands of the clock independently of the clockwork, a transmission for imparting a clockwise rotation of said separate pointer in response to the speed of travel of the vehicle, a change speed gear included in said transmission for setting the transmission to rotate the said separate pointer at the same angular velocity as one hand of the clock, when the vehicle is travelling at a given average speed, and means for adjusting the ratio of gear of said change speed gear to suit any predetermined average speed of travel of the vehicle, all with a view to obtaining an indication of any deviation of the actual speed of travel of the vehicle from the said predetermined average speed through observing the difference in units of time readable on the dial of the clock between the separate pointer and the respective hand of the clock.

2. An apparatus for indicating the average speed of travel of a vehicle comprising in combination, a time clock including a clockwork, a dial and hands, a separate pointer mounted for rotation in front of said dial concentrically with the hands of the time clock independently of the clockwork, a transmission for imparting a clockwise rotation to said separate pointer in response to the speed of travel of the vehicle, said transmission comprising a friction wheel geared to said separate pointer for rotating same in the clockwise direction, a friction ratchet mechanism for effecting a stepwise rotation of said friction wheel in one direction, means for operating said friction ratchet mechanism in response to the speed of travel of the vehicle, means for adjusting the angular extension of each step of the friction wheel as caused by the friction ratchet mechanism with a view to adjusting the ratio of gear of the transmission to suit a predetermined average speed of travel of the vehicle by causing the separate pointer to rotate at the same angular speed as one hand of the clock when the vehicle is travelling at said average speed.

3. An apparatus for indicating the average speed of travel of a vehicle comprising in combination, a time clock including a clockwork, a dial and hands, a separate pointer mounted for rotation in front of said dial concentrically with the hands of the time clock independently of the clock-work, a friction wheel geared to the separate pointer for rotating same in clockwise direction, a friction ratchet mechanism for effecting a stepwise rotation of said friction wheel in one direction, said mechanism including a lever mounted to pivot about the same center as the friction wheel, an oblique surface of said lever facing the circumference of the friction wheel, which extends in an oblique direction with relation to said circumference, a spring loaded rolling member inserted between said oblique surface and said circumference, reciprocable means for operating said lever under the control of the movement of travel of the vehicle for causing the friction ratchet mechanism to effect a stepwise rotation of the friction wheel in the said one direction, and manually operable stop means for determining the length of stroke of said reciprocable means in order to effect an adjustment of the ratio of gear of the entire mechanism to suit any desired average speed of travel of the vehicle in such a way as to rotate the separate pointer at the same angular velocity and in the same direction as one hand of the clock, when said average speed of travel is obtained.

4. An apparatus for indicating the average speed of travel of a vehicle comprising in combination, a time clock including a clock-work, a dial and hands, a separate pointer mounted for rotation in front of said dial concentrically with the hands of the time clock independently of the clockwork, a friction wheel geared to the separate pointer for rotating same in clockwise direction, a friction ratchet mechanism for effecting a stepwise rotation of said friction wheel in one direction, said mechanism including a lever mounted to pivot about the same center as the friction wheel, an oblique surface of said lever facing the circumference of the friction wheel, which extends in an oblique direction with relation to said circumference, a spring loaded rolling member inserted between said oblique surface and said circumference, reciprocable means for operating said lever under the control of the movement of travel of the vehicle for causing the friction ratchet mechanism to effect a stepwise rotation of the friction wheel in said one direction, stop means for determining the length of stroke of said reciprocable means in order to effect an adjustment of the ratio of gear of the entire mechanism to suit any predetermined average of speed of travel of the vehicle in such a way as to rotate the separate pointer at the same angular velocity and in the same direction as one hand of the clock, when said average speed of travel is obtained, and a retaining device for positively stopping the friction ratchet wheel in its position after each feed step thereof, said retaining device comprising a rolling element positioned between the circumference of the friction wheel and an oblique stationary surface so arranged as to cause a jamming of the rolling element between it and said circumference on any tendency of the friction wheel towards backward running.

5. An apparatus for indicating the average speed of travel of a vehicle comprising in combination, a time clock including a clock-work, a dial and hands, a separate pointer mounted for rotation in front of said dial concentrically with the hands of the time clock independently of the clockwork, a friction wheel geared to the separate pointer for rotating same in clockwise direction, a friction ratchet mechanism for effecting a stepwise rotation of said friction wheel in one direction, said mechanism including a lever mounted to pivot about the same center as the friction wheel, an oblique surface of said lever facing the circumference of the friction wheel, which extends in an oblique direction with relation to said circumference, a spring loaded rolling member inserted between said oblique surface and said circumference, reciprocable means for operating said lever under the control of the movement of travel of the vehicle for causing the friction ratchet mechanism to effect a stepwise rotation of the friction wheel in said one direction, a rotatably mounted, manually operable circular-disc having a speed scale on its circumferential surface, said disc having further a cam surface for cooperating with the lever to act as a stop for limiting the length of stroke thereof, said cam surface being shaped with a view to effecting a variation of the length of stroke of the lever to suit the ratio of gear of the mechanism for operating the separate pointer as required for rotating said pointer in the same direction and at the same angular speed as one hand of the time clock at a predetermined average speed of travel of the vehicle and a stationary index provided beside the periphery of said disc for permitting an exact setting of the disc to any angular position desired.

6. An apparatus for indicating the average speed of travel of a vehicle comprising in combination, a time clock including a clockwork, a dial and hands, a separate pointer for rotation in front of said dial concentrically with the hands of the time clock independently of the clockwork, a friction wheel geared to the separate pointer for rotating same in clockwise direction, a friction ratchet mechanism for effecting a stepwise rotation of said friction wheel in one direction, said mechanism including a lever mounted to pivot about the same center as the friction wheel, an oblique surface of said lever facing the circumference of the friction wheel, which extends in an oblique direction with relation to said circumference, a spring loaded rolling member inserted between said oblique surface and said circumference, reciprocable means for operating said lever under the control of the movement of travel of the vehicle for causing the friction ratchet mechanism to effect a stepwise rotation of the friction wheel in said one direction, a rotatably mounted circular disc settable in any desired angular position, a logarithmic speed scale being provided on the circumferential surface of said disc, said scale being also arranged to indicate the length of way covered by the vehicle, another disc combined with said first-mentioned disc, said other disc having a logarithmic scale relating to time, so that when the numerals relating to length of way and time, respectively, are adjusted to positions in register with each other, a reading of the speed corresponding to these components may be made at the end point of the scale according to the known principle of a slide-rule, a cam surface being provided on said first-mentioned disc for cooperating with the lever to act as a stop for limiting the length of stroke thereof, said cam surface being shaped with a view to effecting a variation of the length of stroke of the lever to set the ratio of gear of the mechanism for operating the separate pointer to the value required for rotating said pointer at the same angular speed as that of one hand of the time clock, when the vehicle is travelling at a predetermined average speed.

7. An apparatus for indicating the average speed of travel of a vehicle comprising in combination, a time clock including a clockwork, a dial and hands, a separate pointer mounted for rotation in front of said dial concentrically with the hands of the clock independently of the clockwork, a transmission for imparting a clockwise rotation to said separate pointer in response to the speed of travel of the vehicle, a change speed gear included in said transmission for setting the transmission to rotate the said separate pointer at the same angular velocity as one hand of the clock, when the vehicle is traveling at a given average speed, means for adjusting the ratio of gear of said change speed gear to suit any predetermined average speed of travel of the vehicle, all with a view to obtaining an indication of any deviation of the actual speed of travel of the vehicle from the said predetermined average speed through observing the difference in units of time readable on the dial of the clock between the separate pointer and the respective hand of the clock, the transmission for imparting rotation to the separate pointer comprising a friction wheel geared to said separate pointer, a friction ratchet mechanism for effecting a stepwise rotation of said friction wheel in one direction, means including an oscillating lever for operating said friction ratchet mechanism in dependency of the movement of travel of the vehicle, and stop means for cooperation with said lever in order to limit the length of stroke thereof, said stop means being adjustably arranged inasmuch as it comprises a specially profiled edge of a band which is fed at a velocity proportional to the speed of travel of the vehicle for yielding an adjustment of the speed of travel of the vehicle varying according to a given schedule.

References Cited in the file of this patent

UNITED STATES PATENTS

| | | |
|---|---|---|
| 923,511 | Greenbaum | June 1, 1909 |
| 1,888,486 | Boedtcher | Nov. 22, 1932 |
| 2,509,850 | Von Mulinen | May 30, 1950 |
| 2,656,528 | Savino | Oct. 20, 1953 |